United States Patent
Horikoshi et al.

(10) Patent No.: US 12,130,952 B2
(45) Date of Patent: Oct. 29, 2024

(54) INFORMATION PROCESSING APPARATUS AND CONTROL METHOD

(71) Applicant: Lenovo (Singapore) Pte. Ltd., Singapore (SG)

(72) Inventors: Hideto Horikoshi, Kanagawa (JP); Mikio Hagiwara, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 464 days.

(21) Appl. No.: 17/563,495

(22) Filed: Dec. 28, 2021

(65) Prior Publication Data

US 2022/0237328 A1 Jul. 28, 2022

(30) Foreign Application Priority Data

Jan. 27, 2021 (JP) ................................. 2021-011100

(51) Int. Cl.
*G06F 21/70* (2013.01)
*G06F 21/60* (2013.01)
(Continued)

(52) U.S. Cl.
CPC .............. *G06F 21/70* (2013.01); *G06F 21/60* (2013.01); *G06K 19/0723* (2013.01); *H04B 5/77* (2024.01); *G06F 21/88* (2013.01)

(58) Field of Classification Search
CPC .......... G06F 21/70; G06F 21/60; G06F 21/88; G06F 2221/2111; G06F 21/71;
(Continued)

(56) References Cited

U.S. PATENT DOCUMENTS

2013/0303149 A1* 11/2013 Bocking ............ H04N 1/00323
  455/418
2014/0148196 A1* 5/2014 Bassan-Eskenazi ........................
  H04W 4/029
  455/456.1

FOREIGN PATENT DOCUMENTS

JP   2003-288275 A   10/2003
JP   2003-345659 A   12/2003
(Continued)

OTHER PUBLICATIONS

Extended European Search Report issued in corresponding European Patent Application No. 22151980.4, mailed Jun. 22, 2022 (8 pages).

*Primary Examiner* — Izunna Okeke
(74) *Attorney, Agent, or Firm* — Osha Bergman Watanabe & Burton LLP (57) ABSTRACT

A laptop computer includes a processor that executes an operating system, an embedded controller, in communication with the processor, that controls hardware elements within the laptop computer independently of the processor, and a wireless tag unit, embedded within the laptop computer, that is readable and writable with takeout detection information via wireless communication. The takeout detection information indicates that the laptop computer has been taken out from a use permissible location. The embedded controller is programmed to directly communicate with the wireless tag unit to determine whether the takeout detection information has been written on the wireless tag, and upon determining that the takeout detection information has been written on the wireless tag, assert a signal to the processor to restrict at least some functionalities of the processor.

11 Claims, 6 Drawing Sheets

(51) Int. Cl.
    *G06K 19/07*     (2006.01)
    *H04B 5/77*      (2024.01)
    *G06F 21/88*     (2013.01)

(58) Field of Classification Search
    CPC ...... G06K 19/0723; G06K 17/00; H04B 5/77; G06Q 20/40145; H01Q 1/2208; H04W 4/80
    See application file for complete search history.

(56) References Cited

FOREIGN PATENT DOCUMENTS

| | | |
|---|---|---|
| JP | 2006003674 A | 1/2006 |
| JP | 2006-277645 A | 10/2006 |
| JP | 2006338337 A | 12/2006 |
| JP | 2009-211466 A | 9/2009 |
| JP | 2014-153803 A | 8/2014 |
| JP | 2016161955 A | 9/2016 |

* cited by examiner

INFORMATION PROCESSING APPARATUS AND CONTROL METHOD

CROSS-REFERENCE TO RELATED APPLICATIONS

This application claims priority to Japanese Patent Application No. 2021-11100 filed Jan. 27, 2021, the contents of which are hereby incorporated herein by reference in their entirety.

TECHNICAL FIELD

The present disclosure relates to an information processing apparatus and a control method.

BACKGROUND

In recent years, there are known techniques of, when an information processing apparatus such as a laptop personal computer (PC) is stolen, preventing leakage of data stored in the information processing apparatus.

SUMMARY

In one or more embodiments of the present disclosure, a laptop computer includes a processor configured to execute an operating system, an embedded controller in communication with the processor, the embedded controller being configured to control hardware elements within the laptop computer independently of the processor, and a wireless tag unit embedded within the laptop computer, the wireless tag unit including a wireless tag configured to be readable and writable with takeout detection information via wireless communication, the takeout detection information indicating that the laptop computer has been taken out from a use permissible location. The embedded controller is programmed to directly communicate with the wireless tag unit to determine whether the takeout detection information has been written on the wireless tag, and upon determining that the takeout detection information has been written on the wireless tag, assert a signal to the processor to restrict at least some functionalities of the processor.

DETAILED DESCRIPTION

An information processing apparatus and a control method according to one or more embodiments of the present disclosure will be described below, with reference to drawings.

Figure 1:
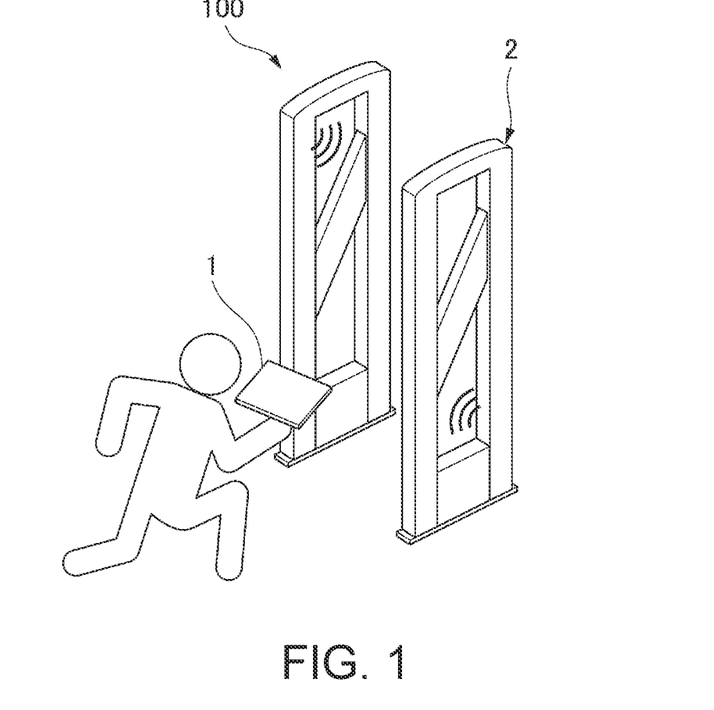
FIG. 1 is a schematic diagram illustrating an example of a security management system.

FIG. 1 is a schematic diagram illustrating an example of a security management system 100 according to one or more embodiments.

As illustrated in FIG. 1, the security management system 100 includes a laptop personal computer (PC) 1 and an entrance and exit gate 2. This embodiment describes the laptop PC 1 as an example of an information processing apparatus.

The laptop PC 1 is an information processing apparatus that is permitted to be used in a use permissible location and subjected to management in the security management system 100. In the case where the laptop PC 1 is taken out (carried out or removed) from the use permissible location, the laptop PC 1 performs a process of restricting information processing functions executable by the laptop PC 1. The detailed structure of the laptop PC 1 will be described later.

The entrance and exit gate 2 is an apparatus installed at an entrance and exit of the use permissible location, and contains a reader-writer of a radio frequency identifier (RFID) tag 4 described later. When the laptop PC 1 is taken out from the use permissible location, the entrance and exit gate 2 uses the reader-writer to perform a process of writing, on the RFID tag 4 attached to the laptop PC 1, takeout detection information indicating that the laptop PC 1 has been taken out from the use permissible location.

Figure 2:
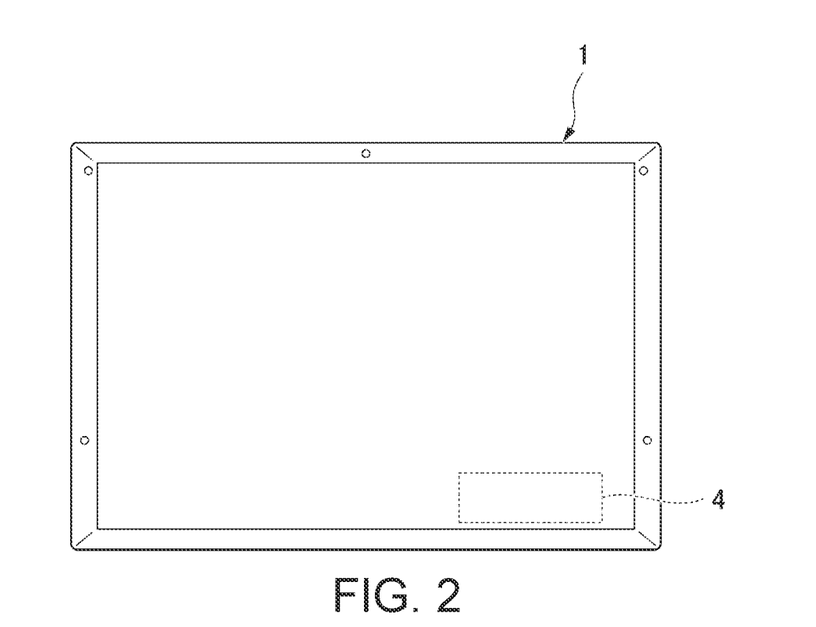
FIG. 2 is a diagram illustrating an example of the appearance of a laptop PC.

FIG. 2 is a diagram illustrating an example of the appearance of the laptop PC 1 according to one or more embodiments.

FIG. 2 illustrates a back chassis of the laptop PC 1. As illustrated in FIG. 2, the RFID tag 4 is attached in a state of being contained in the chassis of the laptop PC 1, and located at an edge of the chassis of the laptop PC 1 so as to enable wireless communication.

The hardware structure of the laptop PC 1 will be described below, with reference to FIG. 3.

Figure 3:
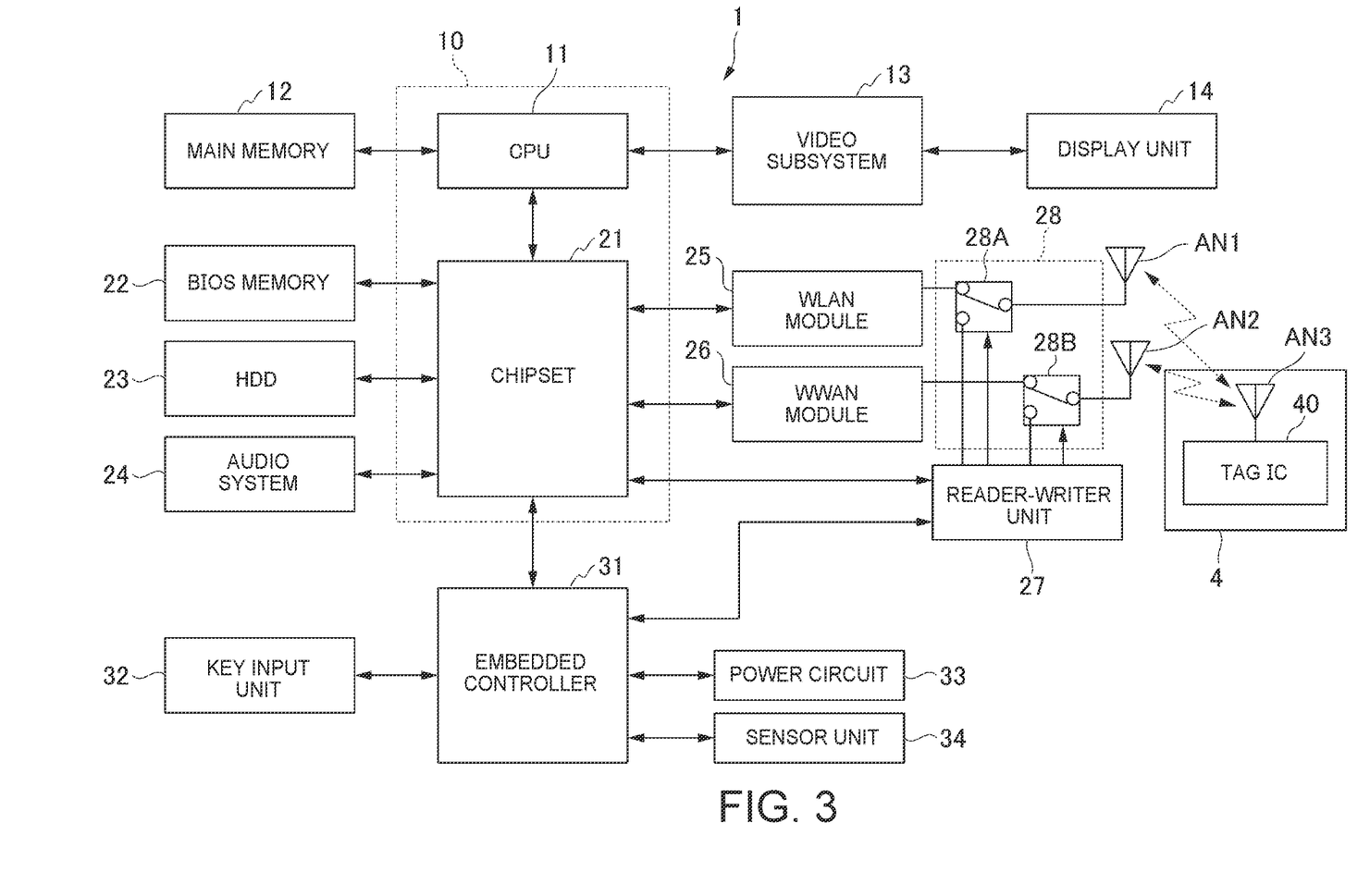
FIG. 3 is a diagram illustrating an example of the main hardware structure of the laptop PC.

FIG. 3 is a diagram illustrating an example of the main hardware structure of the laptop PC 1 according to one or more embodiments.

As illustrated in FIG. 3, the laptop PC 1 includes a CPU 11, a main memory 12, a video subsystem 13, a display unit 14, a chipset 21, a BIOS memory 22, a HDD 23, an audio system 24, a WLAN module 25, a WWAN module 26, a reader-writer unit 27, a switching unit 28, an embedded controller 31, a key input unit 32, a power circuit 33, a sensor unit 34, the RFID tag 4, an antenna AN1, and an antenna AN2.

The CPU (Central Processing Unit) 11 performs various arithmetic processing by program control, and controls the overall laptop PC 1.

The main memory 12 is a writable memory used as an area for reading execution programs of the CPU 11 or a work area for writing processed data of the execution programs. For example, the main memory 12 is made up of a plurality of DRAM (Dynamic Random Access Memory) chips. The execution programs include an OS (Operating System), various device drivers for hardware-operating peripherals, various services/utilities, and application programs.

The video subsystem 13 is a subsystem for implementing functions relating to image display, and includes a video controller. The video controller processes a rendering instruction from the CPU 11, and writes the processed rendering information to a video memory. The video controller also reads the rendering information from the video memory, and outputs it to the display unit 14 as rendering data (display data).

The display unit 14 is, for example, a liquid crystal display or an organic electroluminescence (EL) display, and displays, as a main screen of the laptop PC 1, a display screen based on the rendering data (display data) output from the video subsystem 13.

The chipset 21 includes controllers such as USB (Universal Serial Bus), Serial ATA (AT Attachment), SPI (Serial Peripheral Interface) bus, PCI (Peripheral Component Interconnect) bus, PCI-Express bus, and LPC (Low Pin Count) bus, and is connected to a plurality of devices. In FIG. 3, devices such as the BIOS memory 22, the HDD 23, the audio system 24, the WLAN module 25, the WWAN module 26, the reader-writer unit 27, and the embedded controller 31 are connected to the chipset 21.

The BIOS (Basic Input/Output System) memory 22 is, for example, composed of an electrically rewritable non-volatile memory such as electrically erasable programmable read only memory (EEPROM) or flash ROM. The BIOS memory 22 stores the BIOS, system firmware for controlling the embedded controller 31, etc., and the like.

The HDD (Hard Disk Drive) 23 (an example of a non-volatile storage) stores an OS, various drivers, various services/utilities, application programs, and various data.

The audio system 24 records, reproduces, and outputs sound data.

The WLAN (Wireless Local Area Network) module 25 connects to a network by wireless LAN and performs data communication. The antenna AN1 is connected to the WLAN module 25 via the below-described switching unit 28.

The antenna AN1 is an antenna for wireless LAN (e.g. 2.45 GHz (gigahertz) or 5.8 GHz).

The WWAN (Wireless Wide Area Network) module 26 connects to a network by wireless WAN and performs data communication. The antenna AN2 is connected to the WWAN module 26 via the below-described switching unit 28.

The antenna AN2 is an antenna for wireless WAN (e.g. 920 MHz (megahertz)).

The WLAN module 25 and the WWAN module 26 are each an example of a wireless communication processing unit that is connected to an antenna for wireless network communication (the antenna AN1 or the antenna AN2) and performs data communication by wireless network communication.

The reader-writer unit 27 is contained in the laptop PC 1, and is capable of at least reading the below-described takeout bit 421 stored in the RFID tag 4 by wireless communication. Herein, the takeout bit 421 set to corresponds to takeout detection information. The reader-writer unit 27 is connected to the chipset 21 by a serial interface such as a USB (Universal Serial Bus). The reader-writer unit 27 is connected to the embedded controller 31 by an I2C bus.

The reader-writer unit 27 can write "1" or "0" to the takeout bit 421.

When accessing the RFID tag, the reader-writer unit 27 performs switching control by the switching unit 28 in order to use the antenna AN1 or the antenna AN2. That is, the reader-writer unit 27 accesses the RFID tag using the antenna AN1 or the antenna AN2.

The switching unit 28 connects the antenna for wireless network communication (the antenna AN1 or the antenna AN2) selectively to the reader-writer unit 27 or the corresponding one of the WLAN module 25 and the WWAN module 26. By switching the connection of each of the antenna AN1 and the antenna AN2 by the switching unit 28, each of the antenna AN1 and the antenna AN2 is shared by the reader-writer unit 27 and the corresponding one of the WLAN module 25 and the WWAN module 26.

The switching unit 28 includes a switching unit 28A and a switching unit 28B.

The switching unit 28A connects the antenna AN1 selectively to any of the WLAN module 25 and the reader-writer unit 27, under control of the reader-writer unit 27.

The switching unit 28B connects the antenna AN2 selectively to any of the WWAN module 26 and the reader-writer unit 27, under control of the reader-writer unit 27.

In normal times, the switching unit 28 connects the antenna AN1 and the WLAN module 25 and connects the antenna AN2 and the WWAN module 26 under control of the reader-writer unit 27. When accessing the RFID tag 4, the switching unit 28 switches the connection of the antenna AN1 or the antenna AN2 to the reader-writer unit 27 under control of the reader-writer unit 27.

The embedded controller 31 (an example of an embedded control unit) is a one-chip microcomputer that monitors and controls each device (peripherals, sensors, etc.) regardless of the system state of the laptop PC 1. The embedded controller 31 also has a power management function of controlling the power circuit 33. The embedded controller 31 is composed of a CPU, a ROM, a RAM, and the like (not illustrated), and includes A/D input terminals, D/A output terminals, timers, and digital input and output terminals of a plurality of channels. The embedded controller 31 is connected to the key input unit 32, the power circuit 33, the sensor unit 34, and the like via these input and output terminals, and controls their operations.

The embedded controller 31 controls the power circuit 33 depending on the system state (e.g. S0 state (S0x state) to S5 state) defined in the ACPI (Advanced Configuration and Power Interface) specifications. S0 state is the most active state, and is a typical operation state (normal operation state). S3 state corresponds to sleep mode, and S4 state corresponds to hibernation mode. S5 state is a shut-down state (power off state) in which power is turned off by software. S0x state corresponds to modern standby mode.

The key input unit 32 is an input device such as a keyboard or a touch panel, and receives key input from the user.

The power circuit 33 includes, for example, a DC/DC converter, a charge/discharge unit, a battery unit, and an AC/DC adapter, and converts a DC voltage supplied from the AC/DC adapter or the battery unit into a plurality of voltages necessary to operate the laptop PC 1. The power circuit 33 supplies power to each unit in the laptop PC 1, based on control by the embedded controller 31.

The sensor unit 34 is, for example, an accelerometer, and is capable of detecting the moving state of the laptop PC 1 (i.e. a state in which the laptop PC 1 is moving) by detecting acceleration.

The RFID tag 4 (an example of a wireless tag) is a tag that is attached to the laptop PC 1 (information processing apparatus) and is capable of having takeout detection information written thereto and read therefrom by wireless communication. The takeout detection information indicates that the laptop PC 1 has been taken out from the use permissible location. The RFID tag 4 includes an antenna AN3 and a tag IC 40.

The antenna AN3 is an antenna capable of data communication with the reader-writer unit 27 by wireless communication via the antenna AN1 or the antenna AN2. The antenna AN3 is used for data communication, and also supplied with power for operating the tag IC.

The tag IC (Integrated Circuit) 40 is an integrated circuit that performs data communication with the reader-writer unit 27 by wireless communication via the antenna AN3, and is capable of writing and reading the takeout detection information.

In this embodiment, the CPU 11 and the chipset 21 correspond to a main control unit 10. The main control unit 10 performs processes based on an OS (e.g. Windows®).

The functional structure of the laptop PC 1 according to this embodiment will be described below, with reference to FIG. 4.

Figure 4:
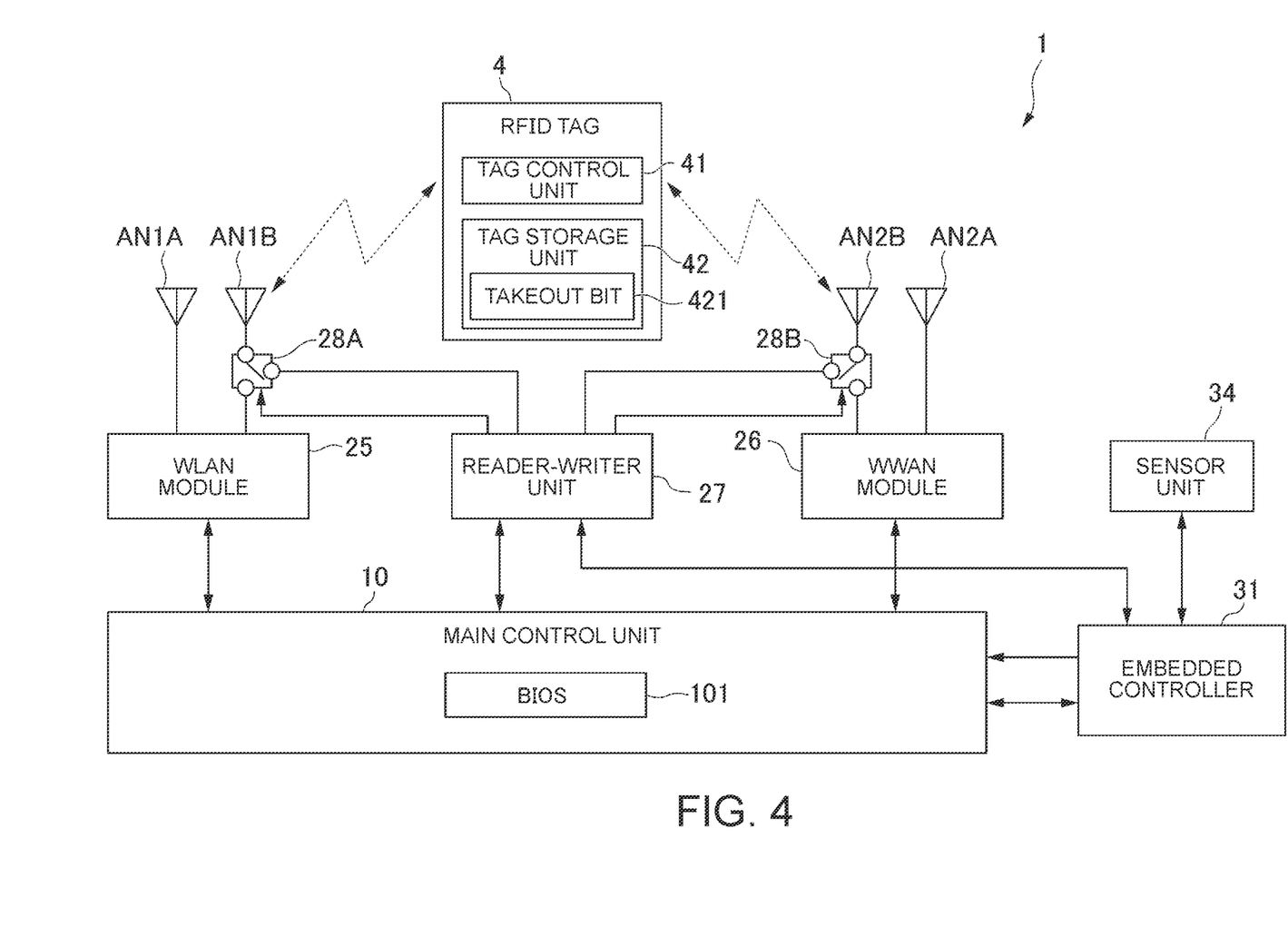
FIG. 4 is a block diagram illustrating an example of the functional structure of the laptop PC.

FIG. 4 is a block diagram illustrating an example of the functional structure of the laptop PC 1 according to one or more embodiments.

As illustrated in FIG. 4, the laptop PC 1 includes the main control unit 10, the RFID tag 4, the WLAN module 25, the WWAN module 26, the reader-writer unit 27, the switching unit 28A, the switching unit 28B, the embedded controller 31, and the sensor unit 34. FIG. 4 illustrates only the main functional structure of the laptop PC 1 relating to this embodiment of the present disclosure.

In FIG. 4, the antenna AN1 includes an antenna AN1A and an antenna AN1B. The antenna AN1A is directly connected to the WLAN module 25, and the antenna AN1B is connected to the WLAN module 25 via the switching unit 28A.

The antenna AN2 includes an antenna AN2A and an antenna AN2B. The antenna AN2A is directly connected to the WWAN module 26, and the antenna AN2B is connected to the WWAN module 26 via the switching unit 28B.

The RFID tag 4 includes a tag control unit 41 and a tag storage unit 42.

The tag control unit 41 is a functional unit implemented by the foregoing tag IC 40. The tag control unit 41 includes, for example, a CPU, and integrally controls the RFID tag 4. The tag control unit 41 executes a process corresponding to a command (processing request) received from the reader-writer unit 27 by wireless communication, and outputs a response (processing response) to the reader-writer unit 27 as an execution result by wireless communication.

The tag storage unit 42 is a functional unit implemented by the foregoing tag IC 40. For example, the tag storage unit is composed of an electrically rewritable non-volatile memory such as EEPROM or flash ROM. The tag storage unit 42 includes the takeout bit 421.

The takeout bit 421 is flag information indicating whether the laptop PC 1 has been taken out from the use permissible location. In the case where the takeout bit 421 is "0", the takeout bit 421 indicates that the laptop PC 1 has not been taken out from the use permissible location. In the case where the takeout bit 421 is "1", the takeout bit 421 indicates that the laptop PC 1 has been taken out from the use permissible location. That is, the foregoing takeout detection information corresponds to the takeout bit 421 set to "1".

For example, the tag control unit 41 performs a process of writing "1" to the takeout bit 421, in response to a write command from the entrance and exit gate 2 or the reader-writer unit 27. The tag control unit 41 also performs a process of reading the information of the takeout bit 421 (i.e. being "1" (takeout detection information)), in response to a read command from at least the reader-writer unit 27.

The main control unit 10 is a functional unit implemented by the CPU 11 and the chipset 21 executing a program stored in the main memory 12, and performs each type of information processing based on an OS. The main control unit 10 includes a BIOS 101.

The BIOS 101 is implemented, for example, by the CPU 11 reading a program stored in the BIOS memory 22 into the main memory 12 and executing the program. The BIOS 101 starts the OS, and controls various inputs and outputs in the laptop PC 1.

In the case where the BIOS 101 determines that the takeout bit 421 in the RFID tag 4 is "1" by the reader-writer unit 27 reading, from the RFID tag 4, the takeout bit 421 set to "1", the BIOS 101 performs a process of restricting information processing functions executable by the laptop PC 1. That is, in the case where the BIOS 101 detects, from the RFID tag 4, that the laptop PC 1 has been taken out from the use permissible location, the BIOS 101 performs the process of restricting the information processing functions of the laptop PC 1. For example, the process of restricting the information processing functions is a process of disabling all executable information processing functions. In this case, the start of the OS of the laptop PC 1 is disabled to make the laptop PC 1 unusable.

In the case where the system state of the laptop PC 1 is S0 state or modern standby mode (S0x state), the BIOS 101 performs a process of disabling the executable information processing functions in response to an event (e.g. SMI (System Management Interrupt)) output from the below-described embedded controller 31.

When the main control unit 10 transitions from a stopped state (e.g. S3 state to S5 state) to a state capable of information processing (e.g. S0 state), the BIOS 101 determines whether "1" is written in the takeout bit 421 in the RFID tag 4 by wireless communication using the reader-writer unit 27. In the case where the BIOS 101 determines that "1" is written in the takeout bit 421 in the RFID tag 4, the BIOS 101 performs the process of disabling the executable information processing functions.

Specifically, in the case where the system state of the laptop PC 1 is S3 state (sleep mode), S4 state (hibernation mode), or S5 state (shut-down state), the BIOS 101, when performing a recovery process or a start process, determines whether "1" is written in the takeout bit 421 in the RFID tag 4 by wireless communication using the reader-writer unit 27. In the case where the BIOS 101 determines that "1" is written in the takeout bit 421 in the RFID tag 4, the BIOS 101 performs the process of disabling all executable information processing functions.

In the case where a predetermined password is input, the BIOS 101 enables the disabled executable information processing function. In detail, in the case where a predetermined supervisor password (SVP) is input during the start process of the laptop PC 1, the BIOS 101 performs a recovery process of enabling and recovering the executable information processing functions. In the recovery process, the BIOS 101 may perform a process of writing "0" to the takeout bit 421 in the RFID tag 4 using the reader-writer unit 27.

In the case where an attempt to wirelessly communicate with the RFID tag 4 using the reader-writer unit 27 has failed, the BIOS 101 may perform the process of disabling the executable information processing functions. In detail, in the case where there is a possibility that the RFID tag 4 has been detached from the laptop PC 1, the BIOS 101 may perform the process of disabling the executable information processing functions.

In the case where the main control unit 10 detects that the laptop PC 1 has been taken out from the use permissible location by a means other than using information that the takeout bit 421 is "1", the main control unit 10 performs a process of writing "1" to the takeout bit 421 in the RFID tag 4 by wireless communication using the reader-writer unit 27. For example, the following (1) to (3) are cases where the main control unit 10 detects that the laptop PC 1 has been taken out from the use permissible location by a means other than using information that the takeout bit 421 is "1".

(1) The laptop PC 1 has not been connected to a network used in the use permissible location for at least a predetermined period.

(2) The position information of the laptop PC 1 detected by a position information detection unit (not illustrated) such as GPS (Global Positioning System) indicates outside the use permissible location.

(3) The laptop PC 1 has not performed an authentication process for a management server (not illustrated) for a specific period.

In the case where the main control unit 10 thus detects, without using the RFID tag 4, that the laptop PC 1 has been taken out from the use permissible location, the main control unit 10 writes "1" to the takeout bit 421 by wireless communication using the reader-writer unit 27. Hence, the BIOS 101 determines that the laptop PC 1 has been taken out from the use permissible location by determining that the takeout bit 421 is "1".

The embedded controller 31 periodically determines whether "1" is written in the takeout bit 421 in the RFID tag 4 by wireless communication using the reader-writer unit 27, in the case where the sensor unit 34 detects the moving state of the laptop PC 1. In the case where the embedded controller 31 determines that "1" is written in the takeout bit 421 in the RFID tag 4, the embedded controller 31 outputs an event (SMI).

The operations of the security management system 100 and the laptop PC 1 according to this embodiment will be described below, with reference to drawings.

When the laptop PC 1 is taken out from the use permissible location and passes through the entrance and exit gate 2, the entrance and exit gate 2 accesses the RFID tag 4 attached to the laptop PC 1 and performs the process of writing "1" to the takeout bit 421 in the RFID tag 4 using the reader-writer contained therein.

Figure 5:
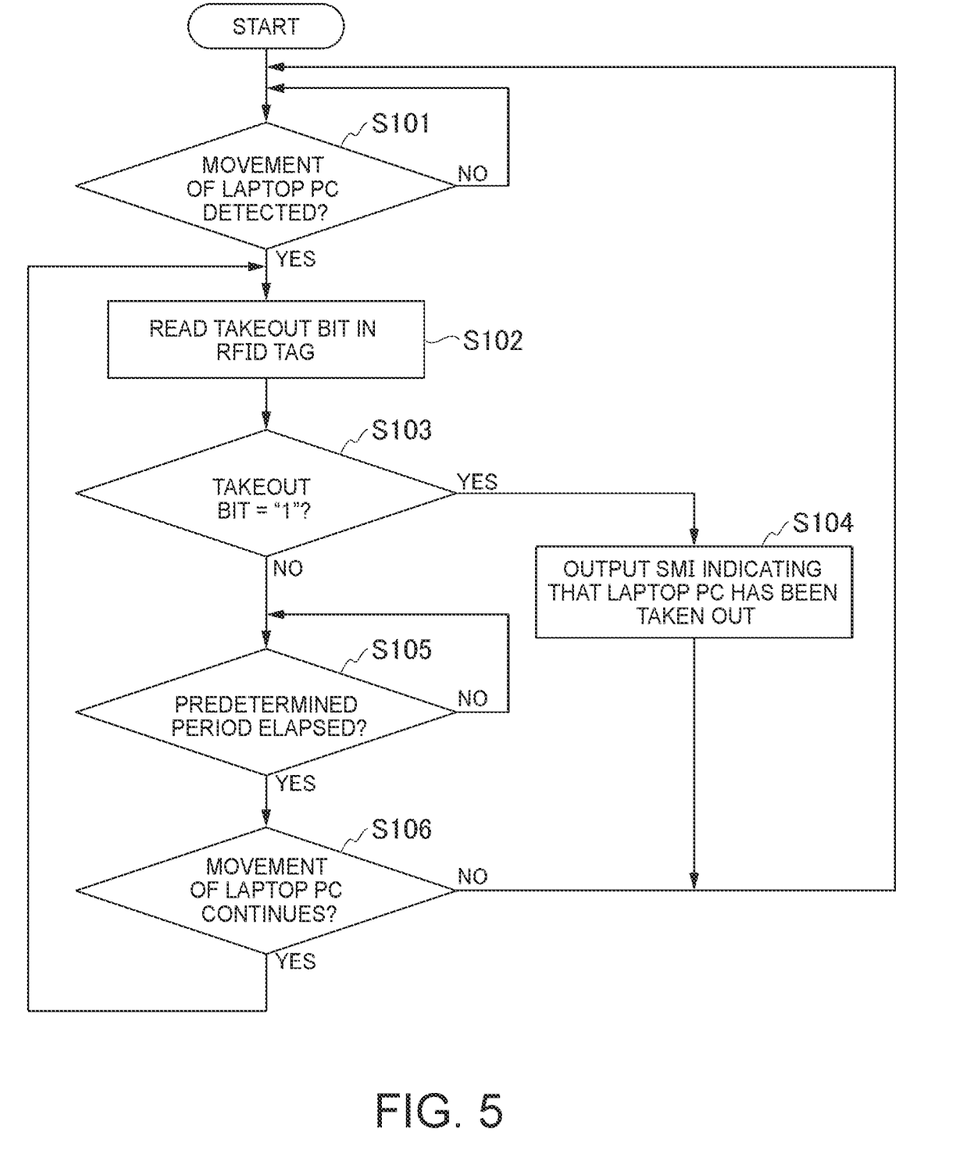
FIG. 5 is a flowchart illustrating an example of a process of detecting takeout (i.e. removal) from a use permissible location in S0 state or modern standby mode of the laptop PC.

FIG. 5 is a flowchart illustrating an example of a process of detecting takeout from the use permissible location in S0 state or modern standby mode (S0x state) of the laptop PC 1 according to one or more embodiments.

As illustrated in FIG. 5, in S0 state or modern standby mode (S0x state), first the embedded controller 31 in the laptop PC 1 determines whether the movement of the laptop PC 1 has been detected (step S101). The embedded controller 31 determines whether the laptop PC 1 is moving, based on the change in acceleration detected by the sensor unit 34. In the case where the embedded controller 31 detects the movement of the laptop PC 1 (step S101: YES), the embedded controller 31 advances to step S102. In the case where the embedded controller 31 does not detect the movement of the laptop PC 1 (step S101: NO), the embedded controller 31 returns to step S101.

In step S102, the embedded controller 31 reads the takeout bit 421 in the RFID tag 4. The embedded controller 31 accesses the RFID tag 4 and reads the takeout bit 421 by wireless communication using the reader-writer unit 27. When accessing the RFID tag 4, the reader-writer unit 27 controls the switching unit 28 to connect the antenna AN1B or the antenna AN2B to the reader-writer unit 27. After step S102, the reader-writer unit 27 controls the switching unit 28 to disconnect the antenna AN1B or the antenna AN2B from the reader-writer unit 27 and connect the antenna AN1B to the WLAN module 25 and connect the antenna AN2B to the WWAN module 26.

The embedded controller 31 then determines whether the takeout bit 421 is "1" (step S103). That is, the embedded controller 31 determines whether "1" is written in the takeout bit 421 read from the RFID tag 4. In the case where the takeout bit 421 is "1" (step S103: YES), the embedded controller 31 advances to step S104. In the case where the takeout bit 421 is not "1" (i.e. the takeout bit 421 is "0") (step S103: NO), the embedded controller 31 advances to step S105.

In step S104, the embedded controller 31 outputs SMI indicating that the laptop PC 1 has been taken out (carried out), to the main control unit 10. After step S104, the process returns to step S101.

In step S105, the embedded controller 31 determines whether a predetermined period has elapsed. For example, the embedded controller 31 determines whether the predetermined period has elapsed, using a timer. In the case where the predetermined period has elapsed (step S105: YES), the embedded controller 31 advances to step S106. In the case where the predetermined period has not elapsed (step S105: NO), the embedded controller 31 returns to step S105.

In step S106, the embedded controller 31 determines whether the movement of the laptop PC 1 continues. The embedded controller 31 determines whether the movement of the laptop PC 1 continues, based on the change in acceleration detected by the sensor unit 34. In the case where the movement of the laptop PC 1 continues (step S106: YES), the process returns to step S102. In the case where the movement of the laptop PC 1 does not continue (step S106: NO), the process returns to step S101.

Thus, by the process in steps S102 to S106, the embedded controller 31 periodically determines whether the takeout detection information is written in the RFID tag 4 by wireless communication using the reader-writer unit 27, in the case where the sensor unit 34 detects the moving state of the laptop PC 1.

Figure 6:
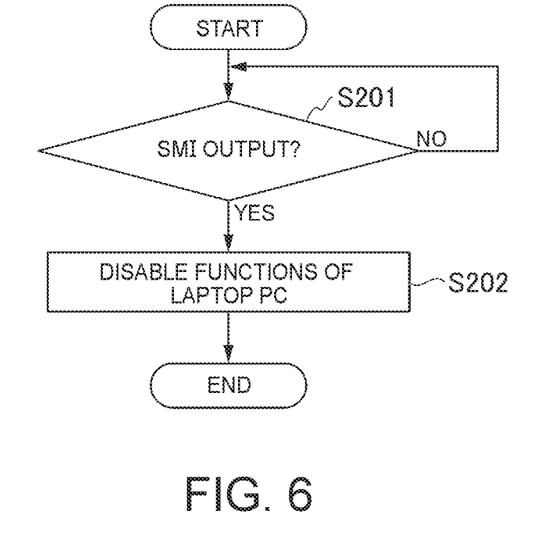
FIG. 6 is a flowchart illustrating an example of a disablement process in the case of takeout from the use permissible location in S0 state or modern standby mode of the laptop PC.

FIG. 6 is a flowchart illustrating an example of a disablement process in the case of takeout from the use permissible location in S0 state or modern standby mode of the laptop PC 1 according to one or more embodiments.

As illustrated in FIG. 6, the main control unit 10 in the laptop PC 1 first determines whether SMI has been output from the embedded controller 31 (step S201). In the case where the SMI has been output from the embedded controller 31 (step S201: YES), the main control unit 10 determines that the laptop PC 1 has been taken out from the use permissible location, and advances to step S202. In the case where the SMI has not been output from the embedded controller 31 (step S201: NO), the main control unit 10 returns to step S201.

In step S202, the main control unit 10 disables the functions of the laptop PC 1. That is, the BIOS 101 in the main control unit 10 disables the functions of the laptop PC 1, thus disabling information processing by the OS. As the process of restricting the executable information processing functions, for example, the BIOS 101 may perform a process of deleting storage information stored in a storage device (e.g. the HDD 23) included in the laptop PC 1. After step S202, the main control unit 10 ends the process.

A process in the case where the laptop PC 1 has been taken out from the usable area when the system state is a stopped state (S3 state to S5 state) will be described below, with reference to FIG. 7.

Figure 7:
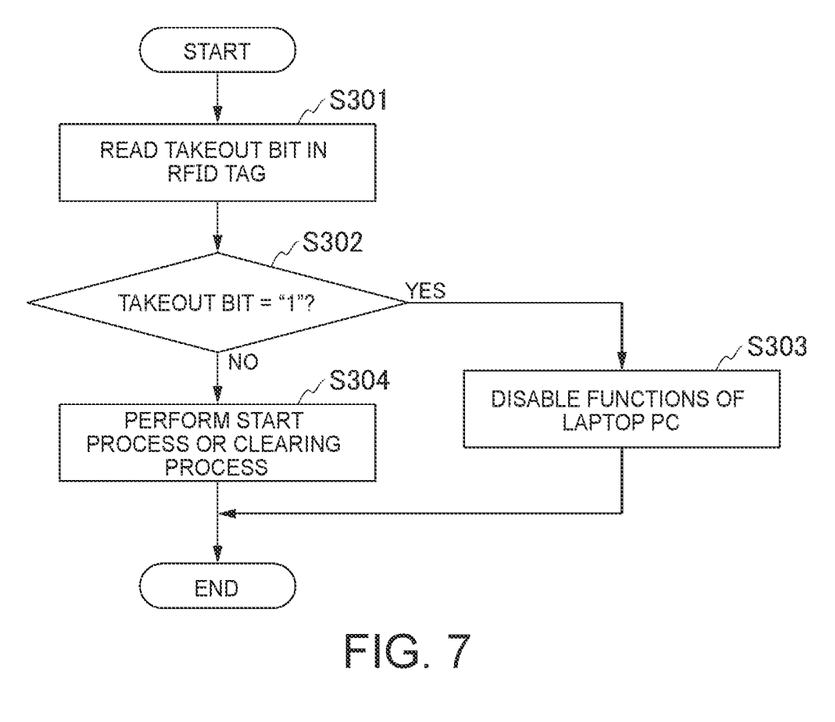
FIG. 7 is a flowchart illustrating an example of a process of detecting takeout from the use permissible location and a disablement process in S3 state to S5 state of the laptop PC.

FIG. 7 is a flowchart illustrating an example of a process of detecting takeout from the use permissible location and a disablement process in S3 state to S5 state of the laptop PC 1 according to one or more embodiments.

In the case where, when the system state of the laptop PC 1 is one of S3 state to S5 state, an event of clearing the one of S3 state to S5 state (or a start event), such as pressing a start switch of the key input unit 32, has occurred, the main control unit 10 in the laptop PC 1 performs the process illustrated in FIG. 7.

As illustrated in FIG. 7, the BIOS 101 in the main control unit 10 performs a process (resume process) of clearing S3 state (sleep mode) or S4 state (hibernation mode) or a process of starting from S5 state (shut-down state).

The BIOS 101 first reads the takeout bit 421 in the RFID tag 4 (step S301). The BIOS 101 accesses the RFID tag 4 and reads the takeout bit 421, by wireless communication using the reader-writer unit 27. When accessing the RFID tag 4, the reader-writer unit 27 controls the switching unit 28 to connect the antenna AN1B or the antenna AN2B to the reader-writer unit 27. After step S301, the reader-writer unit 27 controls the switching unit 28 to disconnect the antenna AN1B or the antenna AN2B from the reader-writer unit 27 and connect the antenna AN1B to the WLAN module 25 and connect the antenna AN2B to the WWAN module 26.

The BIOS 101 then determines whether the takeout bit 421 is "1" (step S302). That is, the BIOS 101 determines whether "1" is written in the takeout bit 421 read from the RFID tag 4. In the case where the takeout bit 421 is "1" (step S302: YES), the BIOS 101 advances to step S303. In the case where the takeout bit 421 is not "1" (i.e. the takeout bit 421 is "0") (step S302: NO), the BIOS 101 advances to step S304.

In step S303, the BIOS 101 disables the functions of the laptop PC 1. That is, the BIOS 101 disables the functions of the laptop PC 1, thus disabling information processing by the OS. As the process of restricting the executable information processing functions, for example, the BIOS 101 may perform a process of deleting storage information stored in a storage device (e.g. the HDD 23) included in the laptop PC 1. After step S303, the BIOS 101 ends the process.

In step S304, the BIOS 101 performs a start process or a clearing process. The BIOS 101 performs a process (resume process) of clearing S3 state (sleep mode) or S4 state (hibernation mode) or a process of starting from S5 state (shut-down state). After step S304, the BIOS 101 ends the process.

A process of clearing the disabled state of the laptop PC 1 according to this embodiment will be described below, with reference to FIG. 8.

Figure 8:
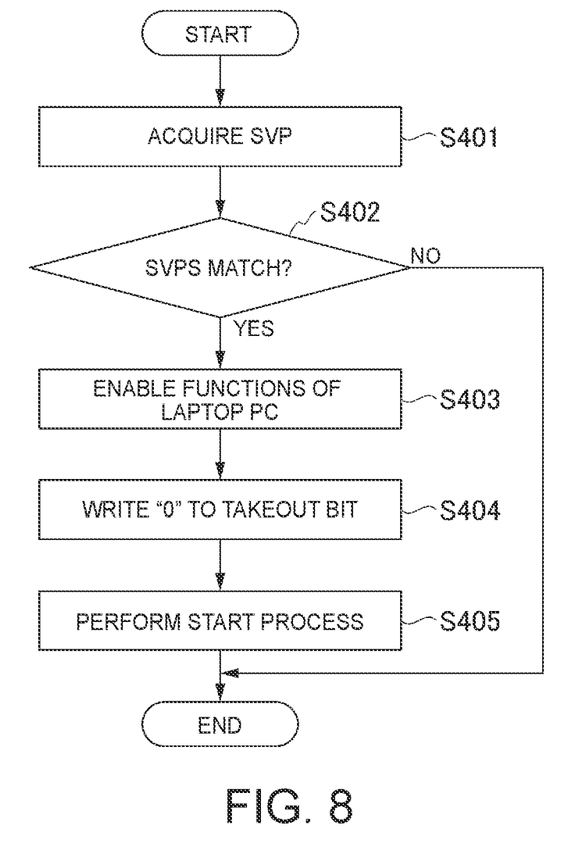
FIG. 8 is a flowchart illustrating an example of a process of clearing the disabled state of the laptop PC.

FIG. 8 is a flowchart illustrating an example of the process of clearing the disabled state of the laptop PC 1 according to one or more embodiments.

As illustrated in FIG. 8, when the laptop PC 1 is in the disabled state, the BIOS 101 in the main control unit 10 first acquires a supervisor password (SVP) (step S401). The BIOS 101 acquires the SVP received by the key input unit 32.

The BIOS 101 then determines whether the SVPs match (step S402). The BIOS 101 determines whether the acquired SVP and a SVP stored in the BIOS memory 22 beforehand match. In the case where the SVPs match (step S402: YES), the BIOS 101 advances to step S403. In the case where the SVPs do not match (step S402: NO), the BIOS 101 ends the process.

In step S403, the BIOS 101 enables the functions of the laptop PC 1. The BIOS 101 enables the disabled functions to make the laptop PC 1 usable.

Next, the BIOS 101 writes "0" to the takeout bit 421 in the RFID tag 4 (step S404). The BIOS 101 writes "0" to the takeout bit 421 in the RFID tag 4 by wireless communication using the reader-writer unit 27.

The BIOS 101 then performs the start process (step S405). After step S405, the BIOS 101 ends the process of clearing the disabled state.

A process in the case where the laptop PC 1 writes "1" to the takeout bit 421 in the RFID tag 4 instead of the entrance and exit gate 2 will be described below, with reference to FIG. 9.

Figure 9:
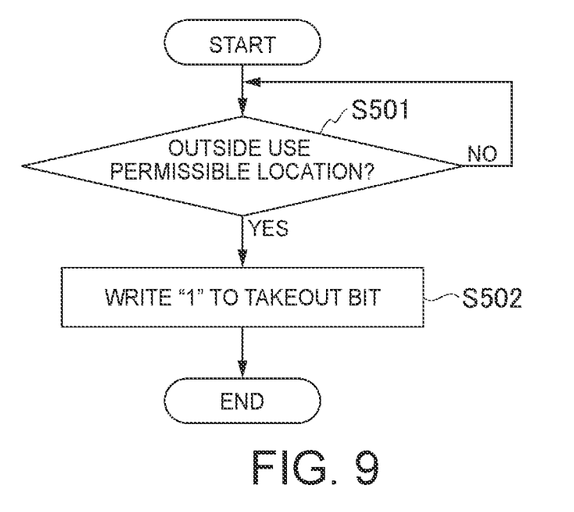
FIG. 9 is a flowchart illustrating an example of a process of writing a takeout bit by the laptop PC.

FIG. 9 is a flowchart illustrating an example of the process of writing the takeout bit 421 by the laptop PC 1 according to one or more embodiments.

As illustrated in FIG. 9, the main control unit 10 in the laptop PC 1 first determines whether the laptop PC 1 is outside the use permissible location (step S501). For example, in the case of any of the foregoing (1) to (3), the main control unit 10 determines that the laptop PC 1 is outside the use permissible location (i.e. the laptop PC 1 has been taken out from the use permissible location), without using the takeout bit 421 in the RFID tag. In the case where the laptop PC 1 is outside the use permissible location (step S501: YES), the main control unit 10 advances to step S502. In the case where the laptop PC 1 is within the use permissible location (step S501: NO), the main control unit 10 returns to step S501.

In step S502, the main control unit 10 writes "1" to the takeout bit 421. The main control unit 10 accesses the RFID tag 4 and writes "1" to the takeout bit 421, by wireless communication using the reader-writer unit 27. After step S502, the main control unit 10 ends the process of writing "1" to the takeout bit 421.

As a result of the process illustrated in FIG. 9, the takeout bit 421 is set to "1", and accordingly the functions of the laptop PC 1 are disabled by the processes illustrated in FIG. 5 to FIG. 7.

As described above, the laptop PC 1 (information processing apparatus) according to this embodiment includes the RFID tag 4 (wireless tag), the reader-writer unit 27, and the main control unit 10. The RFID tag 4 is attached to the laptop PC 1 (information processing apparatus), and configured to have takeout detection information (e.g. the takeout bit 421 set to "1") written thereto and read therefrom by wireless communication, the takeout detection information indicating that the laptop PC 1 has been taken out from a use permissible location. The reader-writer unit 27 is contained in the laptop PC 1, and configured to at least read, by the wireless communication, the takeout detection information stored in the RFID tag 4. The main control unit 10 is configured to perform a process of restricting information processing functions executable by the laptop PC 1, in the case where the main control unit 10 determines, as a result of the reader-writer unit 27 reading the takeout detection information from the RFID tag 4, that the takeout detection information is written in the RFID tag 4.

Thus, the laptop PC 1 according to this embodiment determines that the laptop PC 1 has been taken out from the use permissible location by wireless communication using the RFID tag 4, and restricts the information processing functions of the laptop PC 1. In this way, unauthorized use in other than the use permissible location can be prevented. For example, the laptop PC 1 according to this embodiment can appropriately detect, using the RFID tag 4, that the laptop PC 1 has been taken out from the use permissible location, even in a stopped state in which the laptop PC 1 is not in operation.

The laptop PC 1 according to this embodiment accesses the RFID tag 4 by wireless communication, so that wiring connection inside the chassis of the laptop PC 1 is unnecessary. Therefore, even in the case where the space inside the chassis is small and a wiring space cannot be secured, the laptop PC 1 according to this embodiment can appropriately detect that the laptop PC 1 has been taken out from the use permissible location by wireless communication using the RFID tag 4.

The laptop PC 1 according to this embodiment also includes the sensor unit 34 and the embedded controller 31. The sensor unit 34 is configured to detect a state in which the laptop PC 1 is moving. The embedded controller 31 is configured to, in the case where the sensor unit 34 detects the state in which the laptop PC 1 is moving, periodically determine, using the reader-writer unit 27, whether the takeout detection information is written in the RFID tag 4, and output an event (e.g. SMI) in the case where the embedded controller 31 determines that the takeout detection information is written in the RFID tag 4. The main control unit 10 is configured to perform the process of restricting the executable information processing functions in response to the event (e.g. SMI) output from the embedded controller 31. For example, the takeout detection information is the takeout bit 421 set to "1".

Thus, the laptop PC 1 according to this embodiment can promptly detect that the laptop PC 1 has been taken out from the use permissible location, by detecting the moving state of the laptop PC 1 by the sensor unit 34. The laptop PC 1 according to this embodiment can therefore promptly prevent unauthorized use in other than the use permissible location.

Here, the SMI is an interrupt of highest priority. Hence, the laptop PC 1 according to this embodiment can preferentially perform the process of restricting the executable information processing functions in the case where the laptop PC 1 has been taken out from the use permissible location.

In this embodiment, the main control unit 10 is configured to, when transitioning from a stopped state (S3 state to S5 state) to a state capable of information processing (S0 state), determine, using the reader-writer unit 27, whether the takeout detection information is written in the RFID tag 4, and perform the process of restricting the executable information processing functions in the case where the main control unit 10 determines that the takeout detection information is written in the RFID tag 4.

Thus, for example, the laptop PC 1 according to this embodiment can appropriately prevent unauthorized use in other than the use permissible location even in the case where the laptop PC 1 has been taken out from the use permissible location in the stopped state (S3 state to S5 state) of the main control unit 10.

In this embodiment, the process of restricting the executable information processing functions includes a process of disabling all of the executable information processing functions. The main control unit 10 is configured to disable all of the executable information processing functions, in the case where the main control unit 10 determines that the takeout detection information is written in the RFID tag 4.

Thus, the laptop PC 1 according to this embodiment disables all executable information processing functions in the case where the laptop PC 1 has been taken out from the use permissible location, so that unauthorized use in other than the use permissible location can be prevented more reliably.

In this embodiment, the main control unit 10 is configured to enable the disabled executable information processing functions, in the case where a predetermined password (e.g. SVP) is input.

Thus, the laptop PC 1 according to this embodiment can safely recover to a usable state, in the case where the laptop PC 1 has been taken out from the use permissible location and the executable information processing functions have been disabled.

The laptop PC 1 according to this embodiment includes a wireless communication processing unit (e.g. the WLAN module 25 or the WWAN module 26) and the switching unit 28. The wireless communication processing unit (e.g. the WLAN module or the WWAN module 26) is connected to an antenna for wireless network communication (e.g. the antenna AN1 or the antenna AN2), and performs data communication by wireless network communication. The switching unit 28 connects the antenna for wireless network communication (e.g. the antenna AN1 or the antenna AN2) selectively to one of the wireless communication processing unit (e.g. the WLAN module 25 or the WWAN module 26) and the reader-writer unit 27. In the case of using the reader-writer unit 27 to detect whether the takeout detection information is written in the RFID tag 4, the switching unit 28 switches the antenna for wireless network communication to be connected to the reader-writer unit 27.

Thus, in the laptop PC 1 according to this embodiment, the switching unit 28 allows the antenna (e.g. the antenna AN1 or the antenna AN2) of the wireless communication processing unit (e.g. the WLAN module 25 or the WWAN module 26) to be shared with the reader-writer unit 27, so that an antenna for the reader-writer unit 27 is unnecessary. The laptop PC 1 according to this embodiment can therefore have a simplified structure.

Moreover, in the laptop PC 1 according to this embodiment, for example, the antenna (e.g. the antenna AN1 or the antenna AN2) is used only when using the reader-writer unit 27. Hence, the antenna can be shared with the reader-writer unit 27 without lowering the performance of the normal wireless communication processing unit (e.g. the WLAN module 25 or the WWAN module 26).

In this embodiment, the takeout detection information is written to the RFID tag 4 when passing through an exit gate (e.g. the entrance and exit gate 2) of the use permissible location.

Thus, the laptop PC 1 according to this embodiment can appropriately detect that the laptop PC 1 has been taken out from the use permissible location, because the takeout detection information is appropriately written by the exit gate (e.g. the entrance and exit gate 2) when the laptop PC 1 is unauthorizedly taken out from the use permissible location.

In this embodiment, the main control unit 10 is configured to perform a process of writing the takeout detection information to the RFID tag 4 using the reader-writer unit 27, in the case where the main control unit detects, by a means different from the takeout detection information, that the laptop PC 1 has been taken out from the use permissible location. The case of detecting that the laptop PC 1 has been taken out from the use permissible location by the means different from the takeout detection information includes any of: a case where the laptop PC 1 has not been connected to a network used in the use permissible location for at least a predetermined period; a case where position information of the laptop PC 1 detected by a position information detection unit (e.g. GPS) indicates outside the use permissible location; and a case where the laptop PC 1 has not performed an authentication process for a management server for a specific period.

Thus, the laptop PC 1 according to this embodiment can appropriately detect that the laptop PC 1 has been taken out from the use permissible location, even in the case where the laptop PC 1 has been taken out from the use permissible location without passing through the entrance and exit gate 2.

In this embodiment, the main control unit 10 is configured to perform the process of restricting the executable information processing functions, in the case where the main control unit 10 is unable to communicate with the RFID tag 4 using the reader-writer unit 27.

Thus, the laptop PC 1 according to this embodiment can prevent unauthorized use in the case where the RFID tag 4 is unauthorizedly detached from the laptop PC 1.

In this embodiment, the process of restricting the executable information processing functions may include a process of deleting storage information stored in a storage device (e.g. the HDD 23) included in the laptop PC 1. In this case, the main control unit 10 performs the process of deleting the storage information upon determining that the takeout detection information is written in the RFID tag 4.

Thus, the laptop PC 1 according to this embodiment can more reliably prevent leakage of information, and more reliably prevent unauthorized use in other than the use permissible location.

In this embodiment, the RFID tag 4 is mounted inside the chassis of the laptop PC 1, at an edge of the chassis of the laptop PC 1.

Thus, the laptop PC 1 according to this embodiment can appropriately perform data communication by wireless communication even though the RFID tag 4 is inside the chassis. Since the RFID tag 4 is mounted inside the chassis in the laptop PC 1 according to this embodiment, the possibility of unauthorized detachment of the RFID tag 4 can be reduced.

A control method according to this embodiment is a control method for the laptop PC 1 including the RFID tag 4 and the reader-writer unit 27, including performing, by the main control unit 10, a process of restricting information processing functions executable by the laptop PC 1, in the case where the main control unit 10 determines, as a result of the reader-writer unit 27 reading the takeout detection information from the RFID tag 4, that the takeout detection information is written in the RFID tag 4.

The control method according to this embodiment has the same advantageous effects as the above-described laptop PC 1, and can prevent unauthorized use of the laptop PC 1 in other than the use permissible location.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, although the foregoing embodiments describe the laptop PC 1 as an example of an information processing apparatus, the present disclosure is not limited to such, and other information processing apparatuses such as a tablet terminal device, a desktop PC, and a smartphone may be used.

Although the foregoing embodiments describe an example in which the RFID tag 4 corresponds to both the antenna AN1 (2.45 GHz and 5.8 GHz) for the WLAN module 25 and the antenna AN2 (920 MHz) for the WWAN module 26, the present disclosure is not limited to such. The RFID tag 4 may correspond to either one of the antennas (frequencies). The RFID tag 4 is not limited to wireless communication with such frequencies, and may be a wireless tag of other frequency or type.

Although the foregoing embodiments describe an example in which the laptop PC 1 includes the switching unit 28 and each antenna is shared by the reader-writer unit 27 and the corresponding one of the WLAN module 25 and the WWAN module 26, the present disclosure is not limited to such. The laptop PC 1 may include an antenna for the reader-writer unit 27.

Although the foregoing embodiments describe, as an example of restricting the information processing functions of the laptop PC 1, disabling all functions, the present disclosure is not limited to such, and part of the functions may be disabled.

Although the foregoing embodiments describe an example in which the entrance and exit gate 2 writes the takeout detection information to the RFID tag 4, the present disclosure is not limited to such, and the takeout detection information may be written by a ceiling-mounted reader-writer.

Although the foregoing embodiments describe an example in which the takeout detection information results from writing "1" to the takeout bit 421, the present disclosure is not limited to such. For example, the takeout detection information may be written as a plurality of bits 421.

Each component in the foregoing laptop PC 1 includes a computer system. Processes in the components in the foregoing laptop PC 1 may be performed by recoding a program for implementing the functions of the components in the foregoing laptop PC 1 on a computer-readable recording medium and causing a computer system to read and execute the program recorded on the recording medium. Herein, "causing the computer system to read and execute the program recorded on the recording medium" includes installing the program in the computer system. The "computer system" herein includes an OS and hardware such as peripheral devices.

The "computer system" may include a plurality of computer apparatuses connected via the Internet, a WAN, a LAN, or a network including a communication line such as a dedicated line. The "computer-readable recording medium" refers to a portable medium such as a flexible disk, a magneto-optical disc, a ROM, or a CD-ROM, or a storage device such as a hard disk embedded in the computer system. Thus, the recording medium storing the program may be a non-transitory recording medium such as a CD-ROM.

The recording medium includes a recording medium internally or externally provided to be accessible from a distribution server for distributing the program. A configuration in which the program is divided into a plurality of parts and the components in the laptop PC 1 combine the parts after the parts are downloaded at different timings may be adopted, and distribution servers for distributing the parts into which the program is divided may be different. The "computer-readable recording medium" includes a medium that holds the program for a certain period of time, such as a volatile memory (RAM) inside a computer system serving as a server or a client when the program is transmitted via a network. The program may be a program for implementing some of the above-described functions. The program may be a differential file (differential program) that can implement the above-described functions in combination with a program already recorded in the computer system.

Some or all of the above-described functions may be implemented as an integrated circuit such as large scale integration (LSI). The above-described functions may be individually formed as a processor, or some or all thereof may be integrated into a processor. A method of forming an integrated circuit is not limited to LSI, and may be implemented by a dedicated circuit or a general-purpose processor. In the case where integrated circuit technology that can replace LSI emerges as a result of the advancement of semiconductor technology, an integrated circuit based on such technology may be used.

The invention claimed is:

1. A laptop computer, comprising:
a processor that executes an operating system (OS);
an embedded controller, in communication with the processor, that controls hardware elements within the laptop computer independently of the processor; and
a wireless tag, embedded within the laptop computer, that is readable and writable with takeout detection information via wireless communication;
a reader-writer, contained in the laptop computer, that reads, via wireless communication, the takeout detection information stored in the wireless tag; and
a sensor that detects a state in which the laptop computer is moving, wherein
the takeout detection information indicates that the laptop computer has been taken out from a use permissible location, and
the embedded controller is programmed to:
    directly communicate with the wireless tag to determine whether the takeout detection information has been written on the wireless tag,
    upon determining that the takeout detection information has been written on the wireless tag, assert a signal to the processor to restrict at least some functionalities of the processor, and
    when the sensor detects that the laptop computer is moving:
        periodically determine, using the reader-writer, whether the takeout detection information has been written on the wireless tag; and
        output an event upon determining that the takeout detection information is written in the wireless tag, and
the processor performs a process of restricting information processing functions executable by the laptop computer in response to the event output from the embedded controller.

2. An information processing apparatus comprising:
a wireless tag, attached to the information processing apparatus, that is readable and writable with takeout detection information via wireless communication, the takeout detection information indicating that the information processing apparatus has been taken out from a use permissible location;
a reader-writer, contained in the information processing apparatus, that reads, via wireless communication, the takeout detection information stored in the wireless tag; and
a processor that performs a process of restricting information processing functions executable by the information processing apparatus upon determining, via the reader-writer reading the takeout detection information from the wireless tag, that the takeout detection information is written in the wireless tag,
wherein the processor, when transitioning from a stopped state to a state capable of information processing, determines, using the reader-writer, whether the takeout detection information is written in the wireless tag, and performs the process of restricting the executable information processing functions in a case where the processor determines that the takeout detection information is written in the wireless tag.

3. The information processing apparatus according to claim 2, comprising:
a sensor that detects a state in which the information processing apparatus is moving; and
an embedded controller that, when the sensor detects that the information processing apparatus is moving:
periodically determines, using the reader-writer, whether the takeout detection information is written in the wireless tag, and
outputs an event upon determining that the takeout detection information is written in the wireless tag,
wherein the processor performs the process of restricting the executable information processing functions in response to the event output from the embedded controller.

4. The information processing apparatus according to claim 2,
wherein the process of restricting the executable information processing functions includes a process of disabling all of the executable information processing functions, and
wherein the processor disables all of the executable information processing functions, in a case where the processor determines that the takeout detection information is written in the wireless tag.

5. The information processing apparatus according to claim 4, wherein the processor enables the disabled executable information processing functions, in a case where a predetermined password is input.

6. The information processing apparatus according to claim 2,
wherein the process of restricting the executable information processing functions includes a process of deleting storage information stored in a storage device included in the information processing apparatus, and
wherein the processor performs the process of deleting the storage information, in a case where the processor determines that the takeout detection information is written in the wireless tag.

7. The information processing apparatus according to claim 2, comprising:
a wireless communication processor, connected to an antenna for wireless network communication, that performs data communication by the wireless network communication; and
a switch that connects the antenna for the wireless network communication selectively to one of the wireless communication processor and the reader-writer,
wherein the switch switches the antenna for the wireless network communication to be connected to the reader-writer, in a case of detecting, using the reader-writer, whether the takeout detection information is written in the wireless tag.

8. The information processing apparatus according to claim 2,
wherein the takeout detection information is written to the wireless tag when passing through an exit gate of the use permissible location.

9. The information processing apparatus according to claim 2,
wherein the processor performs a process of writing the takeout detection information to the wireless tag using the reader-writer, in a case where the processor detects, by a means different from the takeout detection information, that the information processing apparatus has been taken out from the use permissible location.

10. The information processing apparatus according to claim 9,
wherein the case of detecting that the information processing apparatus has been taken out from the use permissible location by the means different from the takeout detection information includes any of: a case where the information processing apparatus has not been connected to a network used in the use permissible location for at least a predetermined period; a case where position information of the information processing apparatus detected by a position sensor indicates outside the use permissible location; and a case where the information processing apparatus has not performed an authentication process for a management server for a specific period.

11. An information processing apparatus, comprising:
a wireless tag, attached to the information processing apparatus, that is readable and writable with takeout detection information via wireless communication, the takeout detection information indicating that the information processing apparatus has been taken out from a use permissible location;
a reader-writer, contained in the information processing apparatus, that reads, via wireless communication, the takeout detection information stored in the wireless tag; and
a processor that performs a process of restricting information processing functions executable by the information processing apparatus upon determining, via the reader-writer reading the takeout detection information from the wireless tag, that the takeout detection information is written in the wireless tag,
wherein the processor performs the process of restricting the executable information processing functions, in a case where the processor is unable to communicate with the wireless tag using the reader-writer.

* * * * *